Aug. 4, 1936.  V. F. DAVIS  2,050,042
VALVE REGULATOR
Filed Dec. 20, 1933  2 Sheets—Sheet 1
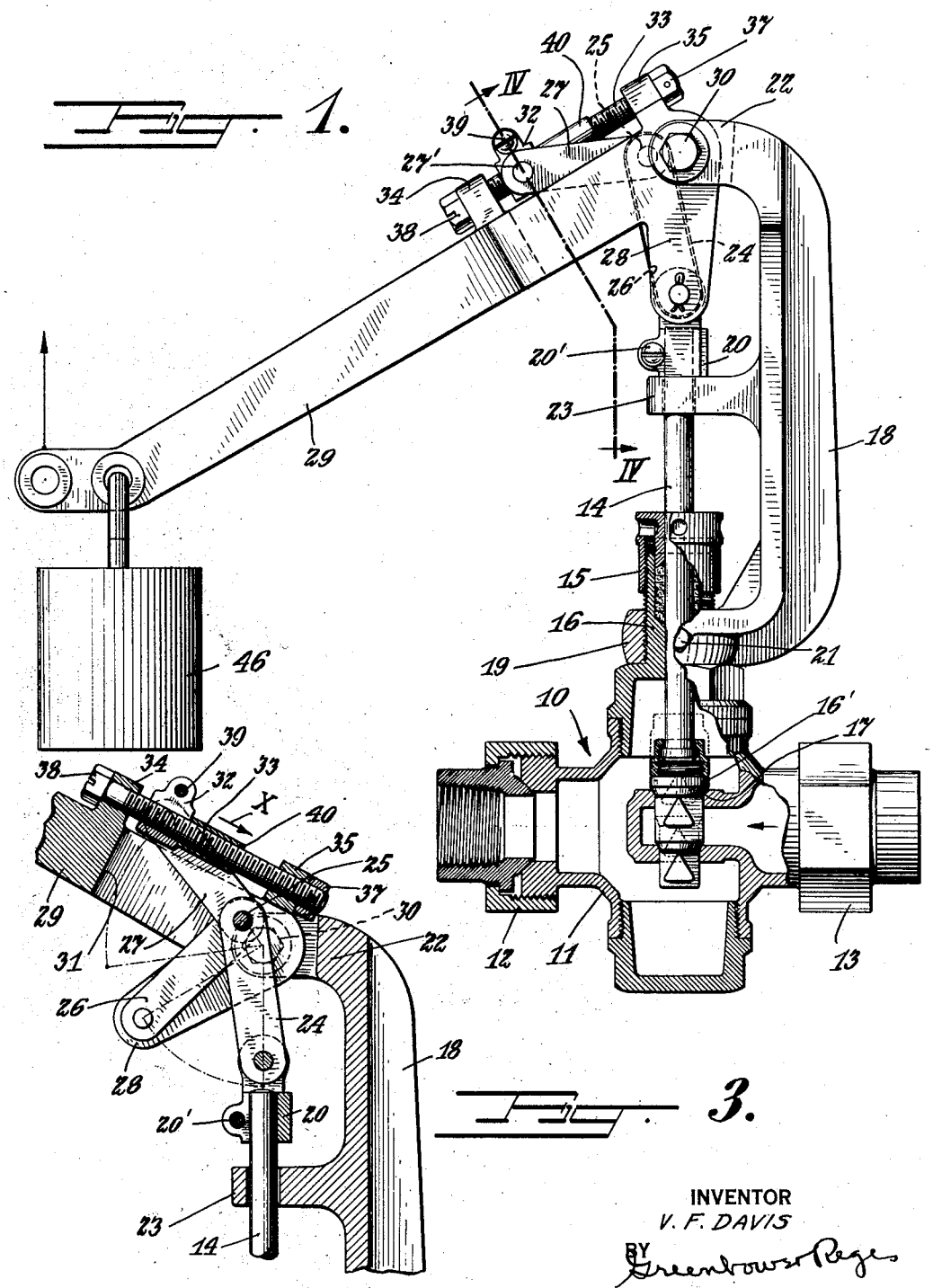
INVENTOR
V. F. DAVIS
BY Greenbower Reges
ATTORNEY Aug. 4, 1936. V. F. DAVIS 2,050,042
VALVE REGULATOR
Filed Dec. 20, 1933 2 Sheets-Sheet 2
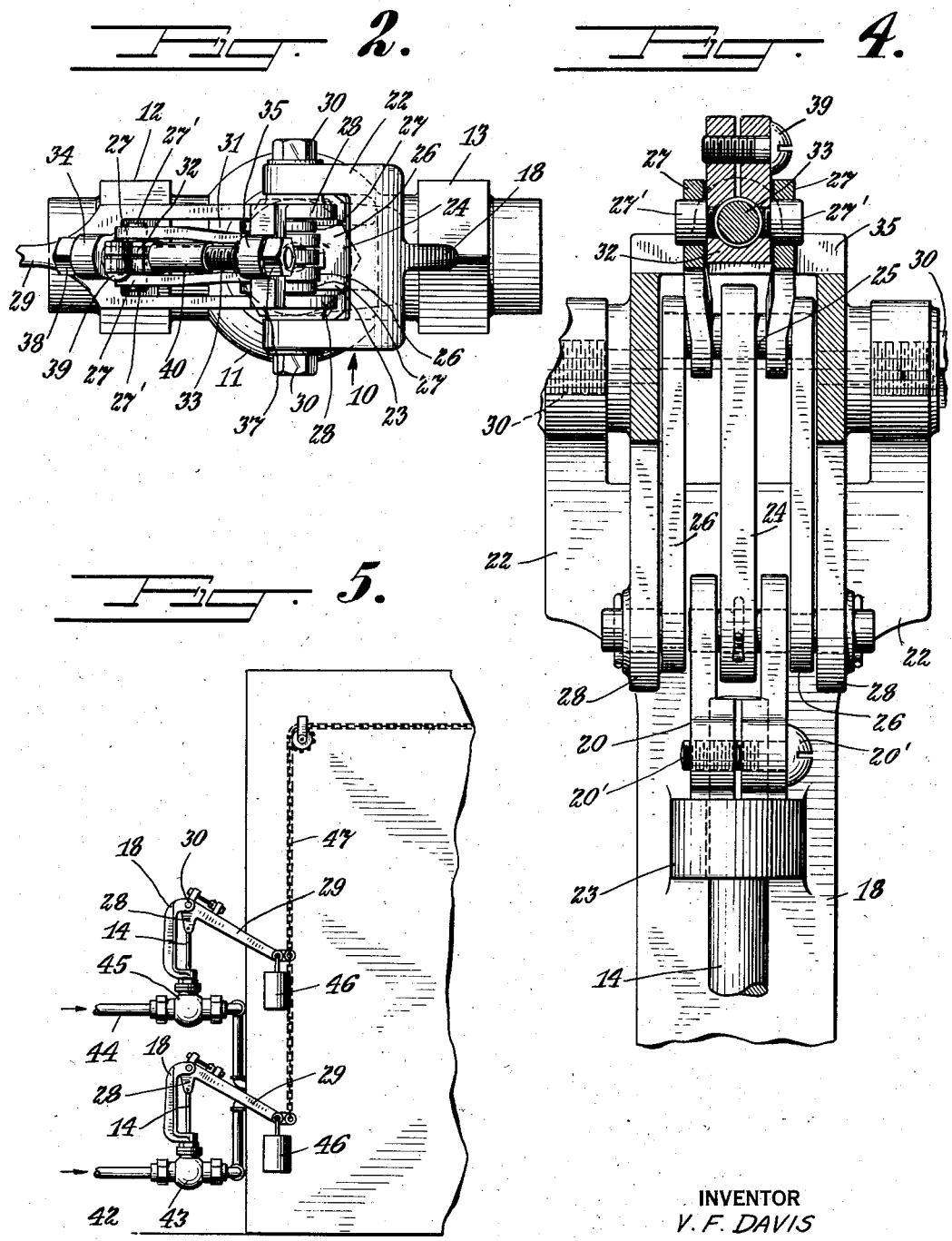
INVENTOR
V. F. DAVIS
BY Greenbower Reges
ATTORNEY Patented Aug. 4, 1936

2,050,042

UNITED STATES PATENT OFFICE 2,050,042

VALVE REGULATOR

Verner F. Davis, West Orange, N. J., assignor to Atlas Valve Company, a corporation of New Jersey Application December 20, 1933, Serial No. 703,175

7 Claims. (Cl. 137—139)

This invention relates to fluid control devices and relates more particularly to means for controlling valves as are commonly used for regulating the flow of air, gas, oil, water or steam.

The use of valves to regulate the flow of fluids is well known and various types of valves are in use constructed with a chamber, flow orifice and stem. The stem is movable to and from the perimeter of the orifice to vary the effective area thereof thus controlling the flow.

Under certain conditions it is desirable to provide a remote control for the valve and to operate the stem, which may be of the sliding type, by means of a lever arm.

In cases where it is necessary to operate a valve from a distant point, as for example, when used in conjunction with the operation of a damper, it is desirable to be able to utilize the full stroke of the operating arm of the valve regulator.

Heretofore it was not possible to utilize the full stroke of the operating lever and provide the necessary adjustability to adapt the valve for use with standard control devices.

In accordance with the present construction a valve may be quickly and conveniently equipped with a regulator operable upon the movement of an operating lever which may be so adjusted as to meet any maximum port opening determined by the load and to meet any increment of opening from maximum to zero.

It is an object of the present invention to provide a valve regulator device of simple and effective construction and adjustable to afford an extremely fine degree of variation in the effective flow area of a valve.

Another object of the invention is to provide a valve regulator device so constructed whereby a differential movement or constant ratio of movement may be attained between an operating lever and a valve stem.

Other objects and advantages of the invention will be evident by reference to the following description together with the accompanying drawings, in which Fig. 1 is a side elevational view of an ordinary fluid control valve having valve operating means applied thereto constructed in accordance with the present invention.

Fig. 2 is a top view of the device shown in Fig. 1.

Fig. 3 is a fragmentary view partly in cross section showing the adjustable elements of the valve operating means.

Fig. 4 is a view taken on line IV—IV in Fig. 1 and

Fig. 5 is a view showing the present invention applied for the simultaneous control of fluid in a plurality of conductors.

The present invention may be applied to any standard valve 10 and the one selected may comprise a casing or chamber 11 having oppositely disposed couplings 12 and 13 for connection to a pipe line through which a fluid to be controlled is caused to flow.

The valve 11 may be provided with a stem 14 slidable vertically through a stuffing box 15 including an externally threaded post 16 integral with the usual valve element 16' which seats on valve seat 17, thus a vertical reciprocation of the stem opens or closes the valve for the regulation of the flow of fluid.

In accordance with the present invention, means are provided whereby the degree of movement of the valve element may be controlled to an extremely fine degree. Means for this purpose, may as shown, comprise a bracket 18 having a foot 19 provided with an internally threaded aperture for attachment to the post 16, a set screw 21 being provided to secure the bracket against relative movement.

The upper end of the bracket is provided with a bifurcated extension or yoke 22 and intermediate the foot 19 and the yoke is a guide bearing 23 integral with the bracket, through which the stem extends. The upper or free end of the stem is pivotally attached by means of a clevis 20 to one end of a link 24. The clevis may be provided with a threaded aperture into which the end of the stem is secured a distance determined by the position required for the valve element 16'. A set screw 20' makes it possible to lock the stem and against relative movement in the clevis.

The other end of the link 24 is provided with an aperture to receive a pin 25 which constitutes an adjustable but normally fixed pivot member.

The pin 25 projects from opposite sides of the link 24 and extends through the ends of two pairs of arms 26—26 and 27—27. The opposite ends of arms 26—26 are pivotally connected to relatively short arms 28—28 of a bell-crank operating lever 29.

The lever 29 is arranged to rock on a pin 30 mounted on the yoke 22. The pin 30 is disposed directly above and in the same plane as the stem 14 so that when the link 24 is vertical its pivot point is the same as that of the operating lever. The space between the arms 28 of the lever 29 provides a pocket or recess 31 to house the elements upon which the adjustable pivot 25 is mounted for movement relative to the fulcrum point of the operating lever. The arms 27—27 have their other ends pivotally attached, by means of tap-bolts or studs 27' to a nut 32 on a threaded rod 33 journaled in bearings 34 and 35 integral with the operating lever 29. The rod 33 is provided with heads 37 and 38 to facilitate a rotation of the rod to move the nut 32 therealong. The nut or traveler 32 is split and provided with a clamping screw 39 for the purpose of clamping the nut in a given adjusted position.

It will be evident that when the operating lever 29 is oscillated the link 24 will transmit motion to the stem 14 to open or close the valve 10. When the pivot 25 is in a given position relative to the operating lever 29 a definite movement will be imparted to the stem when the operating lever is moved upwardly to its limit and will cause a complete upward movement of the stem and a complete downward movement of the operating lever will cause a complete downward movement of the stem.

The operating lever moves a relatively great distance while the stem moves a relatively short distance. The present construction is such that the movements of these operating parts is coincident and as the operating lever reaches its limit of movement the stem also reaches its limit of movement and mechanical differential operation is effected. Each movement of the operating lever taken from any point in its path of travel will cause a movement of the stem giving a constant ratio of movement so that a continuous flow gradient is possible in the valve. Furthermore since, as will be more fully explained, the degree of movement of the stem may be varied without varying the length of the path of travel of the operating lever, an extremely fine degree of control is possible. With the present device it is possible to readily calculate the port opening curve for any size valve so that the desired port opening area may be had. With a construction providing for a 10 inch travel of the operating lever the port opening area of a 4 inch valve may be set for the maximum lift. When the operating lever has moved to the limit of its stroke the opening is 12.56 sq. inches; when the operating lever has moved one half of its full stroke the port opening area is 12.56×.33=4.15 sq. inches. With the valve set for 3/4 of its lift and the operating lever at its full stroke the port opening area is 12.56×.65=8.16 sq. inches and with the same valve lift setting when the operating lever has traveled 1/2 of its full stroke the port opening area is 12.56×.20=2.51 sq. inches.

By reason of the present construction it is possible to set a valve for a minimum fluid flow without the use of a by-pass. This is accomplished by screwing the valve stem 14 into the clevis 20 a sufficient distance to hold the valve partly open when the operating lever 29 is at the lower limit of its stroke. Obviously the relative adjustment of the valve stem makes it possible to obtain the necessary adjustment of the valve element for closing the valve after the valve seat has been ground.

The differential movement between the operating lever and the stem is such that each increment of movement of the operating lever will cause a movement of the stem to a lesser degree but in a definite ratio. Thus instead of an initial movement of the lever causing a complete opening or closing of the valve the valve is controlled throughout the movement of the lever which makes it possible to give the lever a relatively long movement and thus meet the practical requirements of standard regulating equipment with which it is desirable to use the present valve control device.

As shown in the drawings the degree of movement of the stem 14 may be varied by rotating the rod 33 to move the nut 32 to or from a point along the longitudinal axis of the rod. If the nut is moved in the direction of arrow "X" the pivot point 25 is shifted toward the dead center or approaches a point coincident with the pivot point of the operating lever 29. At this point there would be no movement of the valve stem.

A stop sleeve 40 is provided on the rod 33 to prevent movement of the nut 32 past the point at which no movement of the stem would occur. An opposite movement of the nut 32, however, makes the pivot point 25 eccentric with respect to the fulcrum point of the operating lever so that since the operating lever moves the pivot point 25 through an arcuate path the stem 14 will be raised and lowered as the operating lever is oscillated.

It is possible by reason of the adjustable means employed to obtain an extremely fine degree in the variation of flow and the pitch of the threads on the rod 33 may be such that a movement of the nut 32 may be moved to give a micrometer adjustment.

Since the regulator or control device of the present invention makes it possible to utilize the full stroke of the operating lever irrespective of the degree of movement of the valve stem, it is possible to operate a plurality of valves, which may vary in their operation, by a common control. For example, in the case of an oil burner where the oil is atomized by steam it is necessary to control the oil flow in a definite ratio to the steam flow. As shown in Fig. 5, an oil feed pipe 42 may be provided with a valve 43 and a steam pipe 44 may be provided with a valve 45. The valves may each be provided with the present regulator, the lever arms 29 may be provided with weights 46 and connected to a common chain 47.

The chain may lead to a regulating device (not shown), which imparts a given movement to the operating levers which operates to control the oil and steam lines to give the proper mixture of oil and steam in accordance with the setting of the valves.

Although the present regulator is shown as applied to a valve in which the stem moves along its longitudinal axis, it is obvious that the invention may be applied to a stem which rotates since such stem may be provided with an arm which may be oscillated by means of the present operating lever and its cooperating elements.

It will be evident that a valve provided with a regulator constructed in accordance with the present invention has a wide range of use and is an important and useful advance in the art to which it relates.

Although a preferred embodiment of the invention is shown and described herein it will be understood that the structure shown may be modified without departing from the spirit and scope of the invention as set forth in the appended claims.

What is claimed is:

1. A valve having a stem, a bracket supported on said valve, an operating lever movable about a stationary pivot on said bracket, an adjustable pivot mounted on said lever, means for moving said adjustable pivot in an arcuate path relative to said stationary pivot, a link connecting said stem with said adjustable pivot and means for adjusting said stem relative to said link.

2. A valve having a stem, an operating lever for said valve, means for pivotally mounting said lever in operative relation to said valve, a link member, means for pivotally attaching one end of said member to said stem and a pivot for the other end of said link carried by said lever, means for adjusting said pivot along an arcuate path intersecting the path of movement of said stem and means for adjusting said stem relative to said link.

3. A regulator device for a valve having a stem, comprising a bracket mountable on said valve, an operating lever, means for pivotally supporting said lever on said bracket, means for pivotally connecting said stem to said lever and means for adjusting said last mentioned means in an arcuate path intersecting the pivot point of said lever.

4. A regulator device for a valve having a stem, comprising a bracket mountable on said valve, an operating lever, means for pivotally supporting said lever on said bracket, a link having one end pivotally connected to said stem, the other end of said link being pivotally attached to said lever whereby a movement of said lever causes a movement of said stem and means for adjusting said other end of said link by movement through an arcuate path intersecting the pivot point of said lever to vary the degree of movement of said stem upon a movement of said lever.

5. A valve having a stem, a bell-crank lever for said valve, a stationary pivot point for said lever, a link member having one end pivoted to one arm of said lever, a second link member having one end pivoted to the other arm of said lever, a common pivot point for the other ends of said links and a stem operating link having one end pivotally connected to said stem and the other end pivoted on said common pivot point.

6. A valve having a stem, a bell-crank lever for said valve, a stationary pivot point for said lever, a link member having one end pivoted to one arm of said lever, a second link member having one end pivoted to the other arm of said lever, a common pivot point for the other ends of said links and a stem operating link having one end pivotally connected to said stem and the other end pivoted on said common pivot point and means for changing the position of said common pivot point.

7. A valve having a stem, a bell-crank lever for said valve, a stationary pivot point for said lever, a link member having one end pivoted to one arm of said lever, a second link member having one end pivoted to the other arm of said lever, a common pivot point for the other ends of said links and a stem operating link having one end pivotally connected to said stem and the other end pivoted on said common pivot point and means mounted on said lever for varying the relative position of the first mentioned link end.

VERNER F. DAVIS.